(No Model.)
P. H. VANDER WEYDE & O. LUGO.
PROCESS OF PURIFICATION AND DECOLORATION OF SACCHARINE SOLUTIONS
No. 512,133. Patented Jan. 2, 1894.
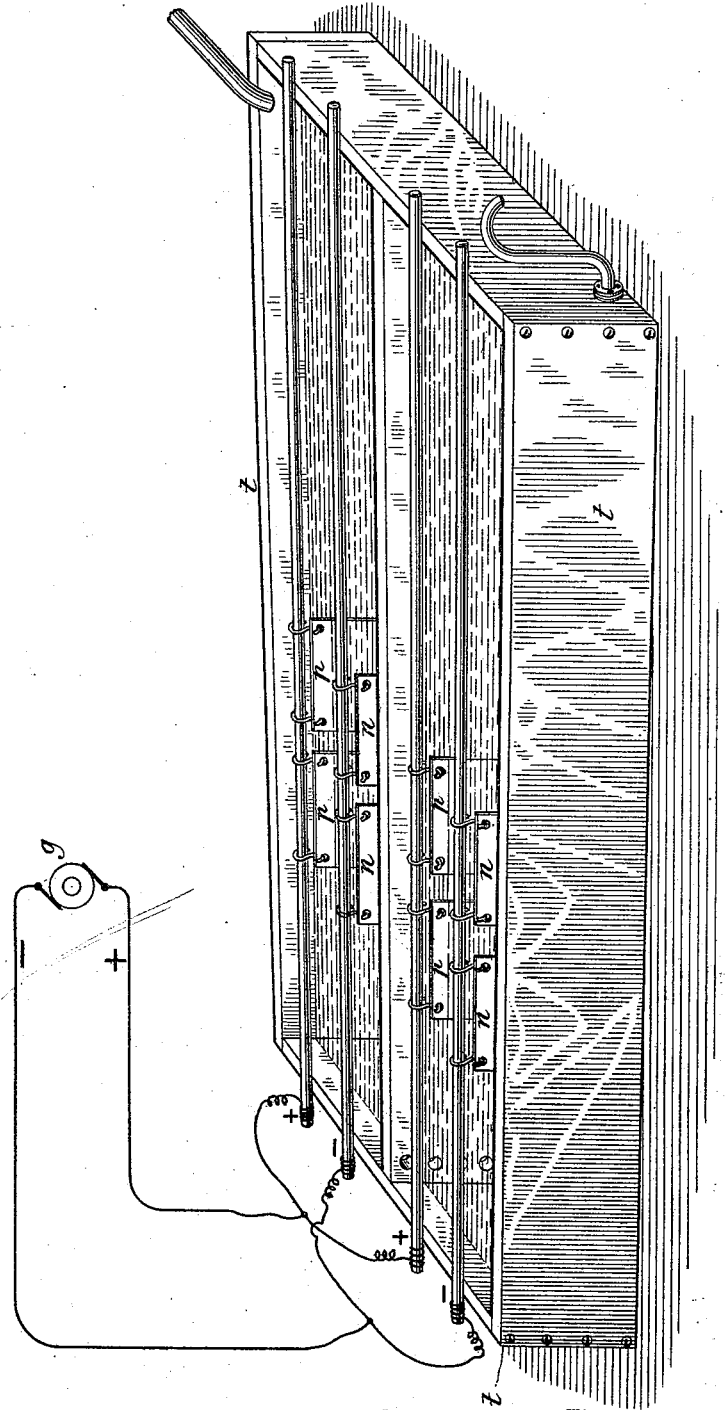
Witnesses
Robert Sheridan
Charles A. Terry
Peter H. Vander Weyde
and Orazio Lugo Inventors
By their Attorneys
Kerr & Curtis

United States Patent Office.

PETER H. VANDER WEYDE AND ORAZIO LUGO, OF NEW YORK, N. Y., ASSIGNORS TO CALEB H. JACKSON, OF SAME PLACE.

PROCESS OF PURIFICATION AND DECOLORATION OF SACCHARINE SOLUTIONS.

SPECIFICATION forming part of Letters Patent No. 512,133, dated January 2, 1894.

Application filed July 24, 1893. Serial No. 481,263. (No specimens.)

*To all whom it may concern:*

Be it known that we, PETER H. VANDER WEYDE and ORAZIO LUGO, both of New York city, in the county and State of New York, have invented a new and useful Process of Purification and Decoloration of Saccharine Solutions, of which the following is a specification.

The process heretofore used at the plantation consists substantially in adding milk of lime to the expressed juice of sugar cane or beet root, boiling it down to a sirup, concentrating it, and finally crystallizing it. It is then sent to the market. This process however does not remove the coloring matter and other impurities, and they remain in the sugar and affect its purity and value. The chief purpose of adding the milk of lime is to retard the fermentation of the gums, and of the grape sugar, and also the partial coagulation of the albuminoidal matters.

The process heretofore used at the refinery consists substantially in melting the raw sugar, adding more lime in order to neutralize any acid present, passing the liquid through bags, which retain any suspended substances and filtering and bleaching the sirup through bone black. The bleached liquor is then crystallized in vacuum pans, purged, washed and sold as refined sugars of different grades.

Our improvement, which is applicable as well at the plantation as at the sugar refinery, is based upon the electrolytic action produced by an electric current when passed through a saccharine solution by the use of an electrode or electrodes composed of metallic aluminum.

In the operation of our process, the oxygen developed on the surface of the aluminum anode, being in the nascent state, combines with the aluminum and changes it into hydrated oxide of aluminum, which at once reacts upon all the foreign substances, and causes their precipitation. The hydrogen is evolved at the cathode and any electro-positive element, such as iron, which the solution may contain is deposited upon the aluminum cathode.

Our invention is of great advantage in the manufacture of raw sugars at the plantation and also in the process of refining. It effects great economy in manufacture and results in an increased and purer product.

The use of our invention at the plantation may be carried out in the following simple manner, with the aid of a nearly automatic apparatus, the construction of which is illustrated by the accompanying drawing which shows a perspective view of a convenient form of the same.

The expressed juice as it comes from the cane or beet-root is heated preferably to about 200° Fahrenheit, and immediately run into a rather shallow tank $t$ provided with plates or electrodes $p$ and $n$ of aluminum metal. The plates are divided into one or more sets or couples and separated from each other in any convenient manner, care being taken that the plates do not touch each other. Each electrode is connected with one of the two poles of an electric generator $g$, preferably a constant current dynamo machine, capable of generating the required current. When the (preferably heated) saccharine juice is run into the tank $t$, the current of electricity is generated in quantity proportionate to the surface of the plates in contact with the juice, and immediately the following reaction will take place:—The plates which are connected with the positive pole of the dynamo will be attacked actively by the oxygen liberated on their surface producing a hydrated oxide of aluminum, while at the surface of the plates, connected with the negative pole of the dynamo, hydrogen gas will be evolved, and any positive metal, such as iron, contained in the saccharine solution will be deposited on the negative plates. The result of this operation is the coagulation of the noxious albuminoidal substances, rendering them insoluble, and thereby decolorizing and sterilizing the saccharine liquor, and thus preventing the loss of sugar by fermentation, which these species of ferments almost immediately induce. The length of time the juice should remain under the influence of the electrolytic action depends upon the kind of juice and the quality of the sugar desired to be produced—generally from five to ten minutes duration of treatment will suffice. When the liquor is taken from the electrolytic tank, it is passed through filtering bags and then boiled down and crystallized in the usual way.

It will be found that the treated liquor will much more quickly run into large crystals and that the color of the sugar produced will be greatly improved. We have found that the intensity or electro-motive force of the electric current need not be higher than from four to six volts. The quantity of current required will depend on the extent of surface of electrodes exposed to the solution. This applies to all kinds of saccharine solutions, such as cane sugar, beet root, and glucose made from cereals of any kind.

We have found, for example, that with a neutral raw sugar solution of fifty per cent., good results are obtained by placing the aluminum electrodes half an inch apart and using a current of six volts electro-motive force. With an anode having fifty square inches of active surface the resistance of such a solution under these conditions is, as we have found, about forty ohms, which gives a current of about fifteen hundredths of an ampère, or three thousandths of an ampère per square inch of active surface of the anode. If desired, a higher electro-motive force may be used, or the electrodes placed nearer together for quicker work, or vice versa.

The application of our process of treating sugar solutions in the large sugar houses where many millions of pounds of sugar of different qualities are refined daily will save much trouble and time and give a greater and better product.

Apparatus similar to that described above and shown in the drawing may be used at the refinery, and at different stages in the process of refining. For instance, one plant consisting of one or more electrolytic vats may be used for treating the liquor as it comes from the melter. Another plant may be used for the treatment of "sweet water," and still another plant for the treatment of molasses-sirup.

The benefit obtained by the use of our process in the refinery will be much more marked than it is in the treatment of the juice at the plantation for the following reasons: The electrolytically treated liquor from the "melter" will be freed from much of the iron, gums and coloring matters and consequently the subsequent action of the bone black will be more perfect, enabling a much larger quantity of liquor to be passed through a given quantity of bone black than if the liquor had not been electrolytically treated. Our filtered liquor being free from gums or albuminoidal substances will crystallize in much shorter time and give better crystals. The liquor treated by our process is completely sterilized, and consequently there will be no danger of fermentation during refining, or of the liquor becoming acid, thereby preventing loss of sugar. The bone black will be much easier washed and more quickly and better revivified in the kilns. The sugar being "free" it will purge well and easily in the centrifugal machine, requiring less water to wash it. The liquors from the centrifugals will not be apt to become dark and may be boiled for sugar without filtering again through bone black.

One of the important applications of our process is to "sweet water." Our process will not only coagulate the remaining albuminoidal substances and decolorize the sweet water, but will also eliminate the iron, which is a very important consideration. The insoluble coagulum generated during the treating of the sweet water may be filtered off or not as may be desired, when the sweet water is used for melting raw sugar. In case the precipitate is not filtered off, it is advisable to treat the sweet water liberally as the excess of hydrate oxide of aluminum present will facilitate the treatment of the liquor from the melter.

When the "sirup" for molasses is intended to be passed through bone black it is advisable to submit it to the electrolytic action; the sirup will then be free from gums and iron and the bone black will act most perfectly and give a sirup best fitted for the conservation of fruit, the table and other uses, not now possible.

An electrolytic tank measuring twelve feet long, six feet wide and one and a half feet deep containing aluminum plates having an exposed active anode surface of two hundred square feet will treat about seven thousand pounds of sugar in solution in about ten (10) minutes or at an average rate of one million pounds of sugar per twenty-four hours. This estimate is based on a raw sugar of 92 test. With higher grades of raw sugars, such as centrifugal sugar, a shorter time, and with lower grades of sugar a longer time will be required to eliminate the impurities with our electrolytic process. It is advisable to fully treat the liquor, as even a too long treatment does not in the least injure the cane or crystallizable sugar. There is no danger of producing inversion to glucose. In fact the process which takes place when sugars are worked by our process is very much similar to that of the bone black; that is to say, of coagulating the impurities and leaving the crystallizable sugar intact.

When the "sweet water" is submitted to our process it is advisable to render it neutral by adding the necessary lime water; and an excess of alkalinity is beneficial, as most of the lime combines with the alumina to form an insoluble compound, thus facilitating the elimination of the iron. It is also recommended to similarly treat all the water used in the refining of sugar, washing of the bone black, &c., the object being the oxidation of the vegetable and nitrogenous substances which the water may contain. Our process will also prevent the loss in crystallizable sugar now taking place in all sugar refineries provided the liquors are completely sterilized.

It is necessary that the anode be made of aluminum, but it is not necessary that the cathode should be composed of aluminum. It may be made of carbon or other material which will not react by secondary action. We prefer however to make them both of aluminum, because all deposits of iron or other substances which may be formed upon the plates may be removed by nitric acid, which, as is well known, will not attack the aluminum, and if the anode wears away the current may be reversed and the cathode be used as the anode; or if by accident the current should be reversed, no undesirable or evil result would follow.

What we claim as our invention is—

1. The process above described of treating saccharine solutions, which consists in generating in the solution to be treated, nascent oxyhydrate of aluminum by passing an electric current through electrodes of aluminum immersed therein.

2. The treatment of saccharine solutions by an electric current introduced by an anode of aluminum, substantially as and for the purposes described.

In witness whereof we have hereunto set our hands this 8th day of July, 1893.

PETER H. VANDER WEYDE.
  ORAZIO LUGO.

Witnesses:
  RALPH S. ROUNDS,
  THOMAS B. KERR.